(12) United States Patent
Weber

(10) Patent No.: US 10,134,081 B2
(45) Date of Patent: Nov. 20, 2018

(54) SINGLE ORDER MULTIPLE PAYMENT PROCESSING

(71) Applicant: Visa International Service Association, San Francisco, CA (US)

(72) Inventor: Lance Weber, Longmont, CO (US)

(73) Assignee: Visa International Service Association, San Francisco, CA (US)

(*) Notice: Subject to any disclaimer, the term of this patent is extended or adjusted under 35 U.S.C. 154(b) by 952 days.

(21) Appl. No.: 13/965,689

(22) Filed: Aug. 13, 2013

(65) Prior Publication Data

US 2014/0052586 A1 Feb. 20, 2014

Related U.S. Application Data

(60) Provisional application No. 61/683,649, filed on Aug. 15, 2012.

(51) Int. Cl.
*G06Q 30/06* (2012.01)

(52) U.S. Cl.
CPC ......... *G06Q 30/0637* (2013.01); *G06Q 30/06* (2013.01)

(58) Field of Classification Search
USPC .......................................................... 705/26
See application file for complete search history.

(56) References Cited

U.S. PATENT DOCUMENTS

| | | |
|---|---|---|
| 6,101,482 A | 8/2000 | DiAngelo et al. |
| 7,853,480 B2 | 12/2010 | Taylor et al. |
| 2005/0119942 A1 | 6/2005 | Horrocks et al. |
| 2005/0209957 A1 | 9/2005 | Kasiviswanathan et al. |
| 2005/0283434 A1 | 12/2005 | Hahn-Carlson et al. |
| 2006/0015454 A1 | 1/2006 | Hahn-Carlson |
| 2007/0192215 A1 | 8/2007 | Taylor et al. |
| 2008/0201261 A1 | 8/2008 | Vides et al. |
| 2008/0294536 A1 | 11/2008 | Taylor et al. |
| 2010/0228672 A1 | 9/2010 | Karim |
| 2012/0066044 A1 | 3/2012 | Honnef et al. |
| 2012/0072349 A1 | 3/2012 | Bernstein et al. |
| 2012/0084208 A1 | 4/2012 | Powell |
| 2012/0209761 A1 | 8/2012 | Vicente et al. |
| 2013/0031006 A1 | 1/2013 | McCullagh |
| 2013/0191286 A1 | 7/2013 | Cronic et al. |
| 2013/0254008 A1* | 9/2013 | Ovick ............... G06Q 30/0225 705/14.26 |
| 2013/0262269 A1 | 10/2013 | O'Leary |
| 2014/0164091 A1* | 6/2014 | Hunt ................. G06O 30/0222 705/14.32 |
| 2015/0089410 A1* | 3/2015 | Liu ..................... G06F 3/04817 715/765 |

* cited by examiner

*Primary Examiner* — Garcia Ade

(74) *Attorney, Agent, or Firm* — Kilpatrick Townsend and Stockton LLP

(57) ABSTRACT

A method and system for providing multiple authorization request messages for multiple products offered by respectively different merchants in a single order are disclosed. If one of the authorization request messages is declined, then an order interrupt message may be sent to the consumer. In order interrupt message may indicate that the single order is canceled, even though authorization request messages for the purchase of other products in the order are approved.

20 Claims, 12 Drawing Sheets

Browser Window

File  Edit  View  History  Bookmarks  Windows  Help

Back  Favorites  Address: www.merchantserviceprovider.com  Go

Confirmation Page

Order Summary

Qty: 1 Test and 1 Hand Scoring of the Test

Price: $550.00

Test with Hand Scoring

*Certificate*

425

Payment Information   435

| Card Type | Visa |
| Number | 5555-5555-5555 |
| Exp. Date | 07/2020 |
| Cardholder Name | John Doe |

Billing Information

| Street | 1701 North Avenue |
| City | Asheville |
| State | North Carolina |
| Zip Code | 28202 |

440

Purchase

FIG. 7

SINGLE ORDER MULTIPLE PAYMENT PROCESSING

CROSS-REFERENCE TO RELATED APPLICATIONS

This application is a non-provisional of and claims the benefit of the filing date of U.S. provisional application No. 61/683,649, filed on Aug. 15, 2012, which is herein incorporated by reference in its entirety for all purposes.

BACKGROUND

There are many different merchants offering many different types of goods. In some cases, such merchants may want to sell their products with other merchants, because different products from different merchants may be complementary. Each merchant may increase sales if they sell their products with other merchants offering complementary products. For example, one merchant may sell gifts while another merchant may sell gift wrapping services. The merchant selling gifts may not provide gift wrapping, but may sell more gifts if some gift wrapping is offered at the time of purchase. This is because buying a gift and having it gift wrapped in one transaction is more convenient for a consumer. For a similar reason, the merchant selling gift wrapping services will sell more gift wrapping services if gifts are offered at the same time.

Some aggregators such as Amazon® offer products for multiple merchants so that a user may purchase different products from different merchants at one time. In this case, the aggregator collects the total payment for all of the products ordered by the user. The aggregator then takes a percentage of the total payment as a fee, and then pays the merchants from the balance.

There are a number of problems with this type of system. First, this type of system requires the aggregator to maintain a significant payments and accounting infrastructure to collect, and distribute funds. Because of this, very few entities can perform this function. Small merchants may therefore have limited choices for selling their products with other merchants. That is, if a small merchant wants to sell its products with other merchants that might offer complementary products, then both merchants must work with a limited number of transaction aggregators.

Further, when a consumer buys multiple items from different merchants, the consumer may only want to purchase the multiple items only if all items can be obtained. If, for example, a consumer wants to buy a table from one merchant and a vase from another merchant, the consumer may only want both products if the consumer can have both products. If one product cannot be obtained, then there is no way for the consumer to prevent the order from occurring.

Embodiments of the invention address these and other problems, individually and collectively.

BRIEF SUMMARY

Embodiments of the present invention relate to systems and methods for processing payment transactions when multiple vendors are involved.

One embodiment of the invention is directed to a method. The method comprises receiving data representing a single order associated with a first set of products and a second set of products from a consumer. The first set of products and the second set of products are offered by a first merchant and a second merchant, respectively. The method also comprises generating a first authorization request message for a first payment transaction, transmitting the first authorization request message to at least one entity associated with at least one funding source, and receiving an authorization response message from the at least one entity. The first authorization request message is associated with a first amount associated with the first set of products. The method also includes generating a second authorization request message for a second payment transaction, transmitting the second authorization request message to the at least one entity, and receiving a second authorization response message from the at least one entity. The second authorization request message is associated with a second amount associated with the second set of products. The method may also comprise transmitting an order interruption message for the single order for the first set of products and the second set of products if one or both of the first and second authorization response messages indicates that the first and/or second authorization request messages is/are declined.

Another embodiment of the invention is directed to a server computer comprising: a processor; and a computer readable medium coupled to the processor, the computer readable medium comprising code, executable by the processor, to perform the above-described method.

Another embodiment of the invention is directed to a method comprising generating, by a computer, data representing a single order associated with a first set of products and a second set of products from a consumer. The first set of products and the second set of products are offered by a first merchant and a second merchant, respectively. The method also comprises transmitting the data representing the single order associated with the first set of products and the second set of products to a server computer. The server computer is configured to generate a first authorization request message for a first payment transaction, transmit the first authorization request message to at least one entity associated with at least one funding source, and receive a first authorization response message from the at least one entity. The first authorization request message is associated with a first amount associated with the first set of products. The server computer is further configured to generate a second authorization request message for a second payment transaction, transmit the second authorization request message to the at least one entity, and receive an authorization response message from the at least one entity. The second authorization request message is associated with a second amount associated with the second set of products. The method also comprises receiving a message relating to a status of the order.

Yet another embodiment of the invention may be directed to a computer that is configured to perform the above-described method.

These and other embodiments of the invention are described in further detail below.

BRIEF DESCRIPTION OF THE DRAWINGS

FIGS. 6-11 show screenshots that can be present in embodiments of the invention.

DETAILED DESCRIPTION

Figure 1:
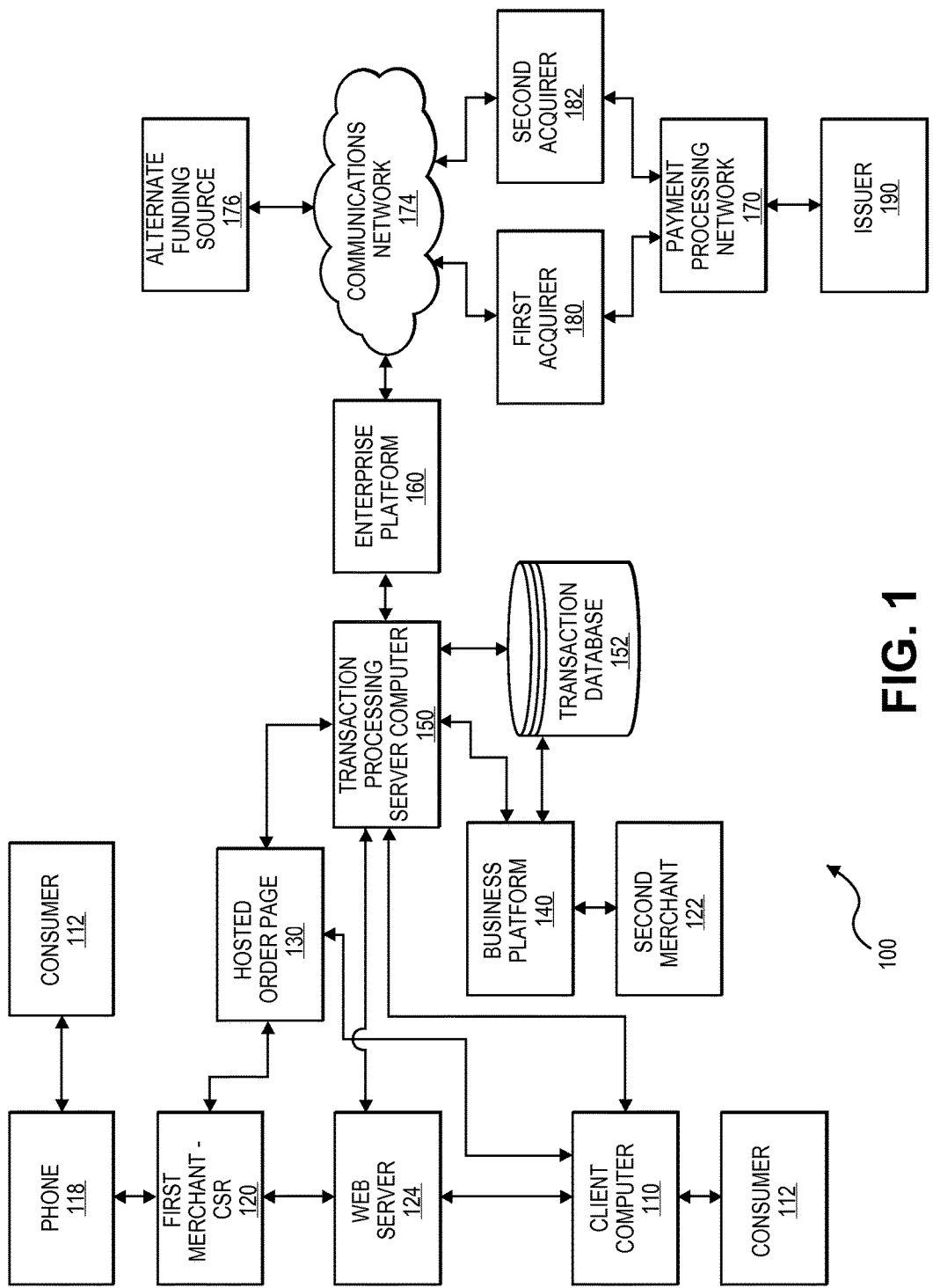
FIG. 1 shows a block diagram of a system according to an embodiment of the invention.

One embodiment of the invention is directed to a method. The method comprises receiving data representing a single order associated with a first set of products (e.g., a test) and a second set of products (e.g., a test scoring service) from a consumer. The first set of products and the second set of products are offered by a first merchant (e.g., a testing service) and a second merchant (e.g., a test scoring service), respectively. The method also comprises generating a first authorization request message for a first payment transaction, transmitting the first authorization request message to at least one entity associated with at least one funding source, and receiving an authorization response message from the at least one entity. The funding source may be a payment account maintained by an entity such as the issuer of a payment card (e.g., a credit card). The first authorization request message is associated with a first amount associated with the first set of products. For example, the first set of products may include a test, which may cost $100. The authorization request message requests authorization from an issuer of the consumer's payment card for $100 to pay the testing service for the test.

The method also includes generating a second authorization request message for a second payment transaction, transmitting the second authorization request message to the at least one entity, and receiving a second authorization response message from the at least one entity. The second authorization request message is associated with a second amount associated with the second set of products. For example, the second set of products may include a test scoring service that may cost $25. The second authorization request message requests authorization from the same issuer of the same payment card for approval of the $25 to pay the test scoring service.

The method may also comprise transmitting a message to a client computer through which the single order was initiated. The message may be a message indicating that the single order has been approved. The message may alternatively be an order interruption message for the single order. The order interruption message may be sent if one or both of the first and second authorization response messages indicates that one or both of the first and second authorization request messages are declined. The order interruption message may indicate that the single order transaction is declined. It may alternatively request that the consumer provide information for an alternative funding source or request instructions as to whether the consumer wishes to accept only the products for which the issuer has approved payment.

In some cases, a subsequent authorization request message on a payment account may be declined, even though a prior authorization request message is approved, because there might be sufficient credit or funds to authorize the prior authorization request messages, but not subsequent ones. For example, in the above example, there may be sufficient funds in a person's debit account to pay for a $100 test, but there may not be sufficient funds to pay for the additional $25 in test scoring services.

Embodiments of the invention have a number of advantages. By implementing embodiments of the invention, a complicated payments infrastructure that collects many and distributes it does not need to be created or maintained. Further, because multiple authorization requests are sent to pay different merchants, the merchants have better records for what was purchased, and it is easier to process chargebacks with each of the individual merchants. Another advantage to embodiments of the invention is that the entity that provides a website and order page for different merchants can remain detached from the payment processing part of the business. Another advantage of embodiments of the invention is that the tracking of payments for different merchants is easier since each merchant will receive payment directly from the consumer, instead of through an intermediate aggregator. The payments can be processed in a way that is similar to how the merchants would receive payments if they processed payments by selling their products by themselves, without other products from other merchants.

Before describing the Figures, some terms that are used may be discussed in further detail.

An "authorization request message" may be an electronic message that requests authorization for a transaction. In some cases, an authorization request message is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. It may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that an issuer returns in response to an authorization request message. The code may serve as proof of authorization.

An "order interrupt message" may include any suitable communication that does not result in immediate and complete acceptance and authorization of a single order. For example, an order interrupt message may include an order decline message that declines the entire order. This may occur if the authorization request message associated with the purchase of at least one of the products to be purchased in the single order is declined while other authorization request messages associated with the purchase of other products are declined or authorized. In another example, an order interrupt message may include a message that requests instructions as to whether the consumer wants to proceed with the transaction for one or more sets of products from one or more sets of merchants, when authorization request messages for one or more sets of products from one or more other merchants are declined. In yet another example, an order interrupt message may include options to pay for one or more products from a merchant from another funding source, if an authorization request message sent to an original funding source was denied.

A "single order" may include one order for a plurality of products offered by two or more different merchants. In some cases, the single order is initiated by a consumer for all products purchased in the single order are initially paid using one or more funding sources (preferably one funding source). Typically, the products in the single order bear some complementary relationship to each other. For example, three different products by three different merchants may include testing services, test scoring services, and testing supply services. In this example, a single order comprising all three products may be initially purchased using a single funding source (e.g., a single credit card account) used by the consumer.

A "set of products" may include one or more products. Products may include goods or services of any suitable type. For example, goods may include office products, electronic products, food, clothing, etc. Services may include entertainment services, professional services, cleaning services, etc.

A "funding source" may include an account that capable of being used to purchase goods or services. Examples of funding sources may include credit, debit or prepaid accounts at issuers. Such accounts may be credit, debit, or prepaid card accounts. Other examples of funding sources may include demand accounts such as savings accounts and checking accounts.

An "issuer" may refer to a business entity (e.g., a bank or other financial institution) that maintains financial accounts for the consumer and often issues a payment device such as a credit or debit card to the consumer.

A "merchant" may refer to an entity that engages in transactions and can sell products such as goods or services to the consumer.

An "acquirer" may refer to a business entity (e.g., a commercial bank or financial institution) that has a business relationship with a particular merchant. Some entities can perform both issuer and acquirer functions.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "payment processing network" may include any suitable combination of computer apparatuses configured to process payments. Suitable payment processing networks may include data processing subsystems, networks, and operations used to support and deliver authorization services, exception file services, and clearing and settlement services. For example, a payment processing network may comprise a server computer, coupled to a network interface (e.g. by an external communication interface), and a database(s) of information. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

FIG. 1 shows a block diagram of a system 100 according to an embodiment of the invention. The system 100 may include a transaction processing server computer 150 that is operationally coupled to and is capable of being in communication with a business platform 140, an enterprise platform 160, a transaction database 152, and a web server 124. The enterprise platform 160 may be in communication with an issuer 190 or other alternate funding source entity 176. As shown in FIG. 1, first and second acquirers 180, 182 and a payment processing network 170 may reside between the enterprise platform 160 and the issuer 190.

The enterprise platform 160 may be an optional component of the system 100. It may comprise one or more computers that can process payment transactions.

The transaction processing server computer 150 can provide routing to the enterprise platform 160 for processing split payments. The transaction processing server computer 150 can also provide construction and response handling for two separate authorization and capture requests. The transaction processing server computer 150 can also provide a unique reconciliation identifier for each order. The transaction processing server computer 150 can also provide rollback capability to void one sale if the other sale is unsuccessful.

Further, the transaction processing server computer 150 can provide persistence of at least two transaction requests and response data. Persistence can imply long-term data storage (e.g., in a database). Further, the transaction processing server computer 150 may be configured to receive refund requests from the Web server 124, and may separate the refund requests for a suborder within a single order. The refund request may be submitted by the Web server 124 can include a unique reconciliation identifier for each single order. The merchant identifiers from the corresponding original single order can be used to process the appropriate refunds by using chargeback processes.

The transaction processing server computer 150 and/or the enterprise platform 160 may communicate with the various entities through a communications network 174. The communications network 174 may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

In the embodiment shown in FIG. 1, a first merchant 120 and a second merchant 122 are shown. Each merchant may operate one or more computers, and may be in communication with the transaction processing server computer 150. The communication may be direct or may be through an intermediate component. Although only two different merchants offering two sets of products are shown for purposes of illustration, it is understood that embodiments of the invention may include many different merchants offering many different sets of products for purchase.

In embodiments of the invention, the first merchant 120 may offer a first set of products for sale and the second merchant 122 may offer a second set of products for sale. These products may be offered on a Web site running on the Web server 124. In this example, the first merchant 120 may be the lead merchant and the Web site may be branded by the first merchant, while offering products sold by the first merchant 120 and the second merchant 122. In other embodiments, the Web site may be run by an entity that is independent of the first and second merchants 120, 122.

The first merchant 120 may have one or more customer service representatives (CSRs) that can accept orders from a consumer 112 by phone 118, computer, etc. As an alternative, a consumer 112 may use a client computer 110 and may contact the Web server 124 to purchase the products of the first and second merchants 120, 122. The second merchant 122 may interact with the system 100 components through a business platform 140.

The business platform 140 may comprise one or more computers that may be configured to allow two or more merchant IDs to be associated with each other so that the merchant's products can be offered together. Further, the business platform 140 can provide a search engine for querying associated sales using a unique identifier like a program-specific key. Users can search on that identifier and display multiple sales that originated as a single order (from the view point of the customer). The business platform 140 can also mark associated orders with the unique identifier (e.g., a program-specific key).

The client computer 110 used by the consumer 112 (or by a CSR of a merchant) may comprise a processor and a computer readable medium coupled to the processor. The computer readable medium may comprise code, executable by the processor, for implementing a method comprising generating, by a computer, data representing a single order associated with a first set of products and a second set of products from a consumer, the first set of products and the second set of products offered by a first merchant and a second merchant, respectively, and transmitting, the data representing a single order associated with the first set of products and the second set of products to a server computer. The server computer is configured to generate a first authorization request message for a first payment transaction, the first authorization request message being associated with a first amount associated with the first set of products, transmit the first authorization request message to at least one entity associated with at least one funding source, and receive a first authorization response message from the at least one entity, and generate a second authorization request message for a second payment transaction, the second authorization request message being associated with a second amount associated with the second set of products, transmit the second authorization request message to the at least one entity, and receive a second authorization response message from the at least one entity. The method further comprises receiving a message relating to a status of the order.

In some embodiments, after the consumer 112 has input order information for the single order into the client computer 110, the order information may be transmitted to the transaction processing server computer 150 before a payment interface (e.g., a Web page that prompts the consumer to enter a credit, debit, or prepaid card account number) is presented to the consumer 112. The transaction processing server computer 150 may provide a hosted order page 130 (or pages) for this purpose. The hosted order page 130 allows a consumer operating the client computer 110 (or via the CSR of the first merchant 120) to provide payment information (e.g., credit card numbers) directly to the transaction processing server computer 150.

The hosted order page 130 may be operated by incorporating a Web script into the Web site run by the Web server 124. The script will forward consumers who are ready to check out to the hosted order page 130, which can be a PCI-compliant order form. The merchant running the Web site may customize the basic content and look of the hosted order page 130. When the consumer 112 clicks a "buy" button on the Web site running on the Web server 124, the consumer's client computer 110 is directed to the secure hosted order page 130. The consumer 112 enters payment data into the hosted order page 130. Transition to this hosted order page 130 can be virtually transparent to the consumer 112.

In embodiments of the invention, the hosted order page 130 can provide the consumer 112 with the total cost of the order, identify a split transaction from a standard transaction, and notify the consumer 112 that payment for the single order will appear as two separate charges on the consumer's account (e.g., charge for the first merchant and one charge for the second merchant). The hosted order page 130 can also associate a split transaction with another split transaction using a unique split transaction identifier, which can be one or more values passed from the request from the Web server 124 to the transaction processing computer 150.

By using the unique split transaction identifier, it is possible to accept one order while conducting multiple payment transactions. In post-sale processing, a challenge can be to the association of the multiple payments to the original single order. For example, when processing refunds, the consumer 112 may want to see all payments associated with the single order. The unique split payment transaction indicator can allow the consumer 112 to see all payments associated with a single order.

The hosted order page 130 and/or the transaction processing server computer 150 can also be configured to provide an order status to the each merchant 120, 122 through a HOP response detailing the results of each sale. Further, the hosted order page 130 and/or the transaction processor server computer 150 can also be configured to provide post backs to two merchant identifiers specified for the particular merchants.

A merchant identifier can be a data value, which may be known as a MID or a merchant ID. Generally, any merchant acquirer may assign one or more unique merchant identifiers for one or more merchant accounts.

Figure 2:
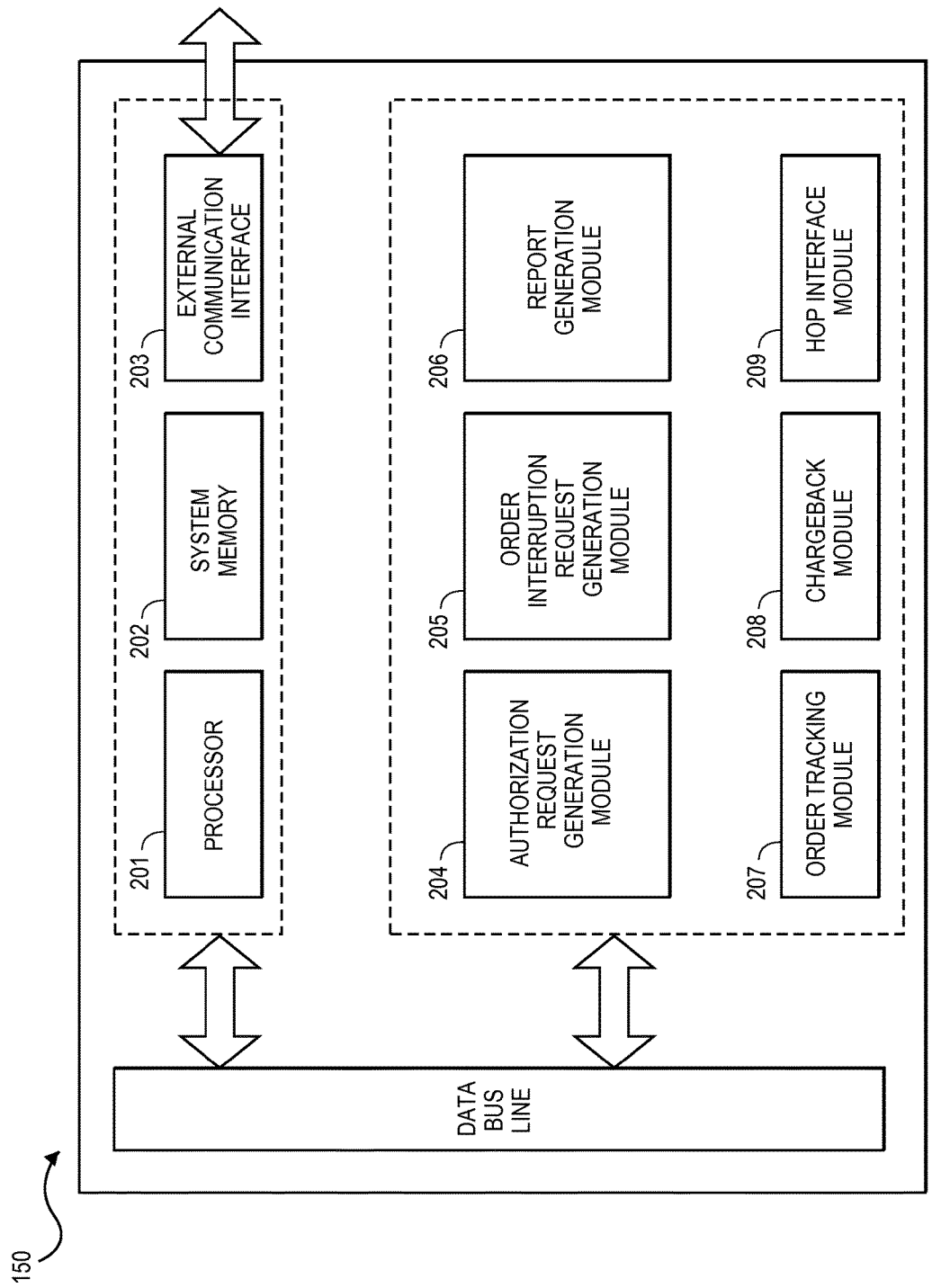
FIG. 2 is a block diagram of a transaction processing computer according to an embodiment of the invention.

FIG. 2 shows a block diagram of a transaction processing server computer 150 according to an embodiment of the invention. The server computer may comprise a processor and a computer readable medium coupled to the processor. The computer readable medium comprises code, executable by the processor, for implementing a method. The method may comprise receiving data representing a single order associated with a first set of products and a second set of products from a consumer. The first set of products and the second set of products are offered by a first merchant and a second merchant, respectively. The method also comprises generating a first authorization request message for a first payment transaction, wherein the first authorization request message is associated with a first amount associated with the first set of products, transmitting the first authorization request message to at least one entity associated with at least one funding source, and receiving a first authorization response message from the at least one entity. The method also includes generating a second authorization request message for a second payment transaction, the second authorization request message being associated with a second amount associated with the second set of products, transmitting the second authorization request message to the at least one entity, and receiving a second authorization response message from the at least one entity.

The exemplary server computer 150 is shown as comprising a processor 201, system memory 202 (which may comprise any combination of volatile and/or non-volatile memory such as, for example, buffer memory, RAM, DRAM, ROM, flash, or any other suitable memory device), and an external communication interface 203. Moreover, one or more of the modules 204-209 may be disposed within one or more of the components of the system memory 202, or may be disposed externally. A data bus line may be used to communicate with the various modules 204-209.

The authorization request generation module 204 may include code for generating and transmitting one or more authorization request messages, and processing one or more authorization response messages.

The order interruption request generation module 205 may include code suitable for generating one or more order interrupt messages.

The report generation module 206 may be programmed or configured to perform some or all of the functionality associated with generating a report regarding a user, an account, a transaction or transactions, or any other entity.

The order tracking module 204 may include code suitable for tracking orders. The order tracking module 204 may keep track of when authorization request messages are transmitted and when authorization response messages are received from the various entities maintaining the funding sources. Once all authorization response messages for payment transactions for a single order are received by the server computer 150, the order tracking module 150 may interface with the HOP interface module 209 and/or the order interruption request generation module 205 to provide the appropriate message (e.g., an order interrupt message or approval message) back to the consumer's client computer.

The chargeback module 208 may be configured to initiate one or more chargeback messages. The chargeback module 208 may work with the order tracking module 207 to process any refunds of one or more products in a single order. The chargeback module 208 may initiate chargebacks by generating chargeback request messages that are sent to the entities associated with the funding source or sources that originally provided authorization response messages indicating approval of individual payment transactions.

The HOP interface module 209 may include code for generating and providing the functionality for one or more HOP Web pages.

Additional modules may also be present in the server computer 150. For example, in some embodiments, a tokenization module may be present to tokenize account numbers for different funding sources. In some cases, the merchants may receive these tokens instead of the actual account numbers, and these tokens may be used to initiate chargebacks and the like. By tokenizing payment account data and not allowing merchants to access original account data, the payment account data is more secure.

Figure 3:
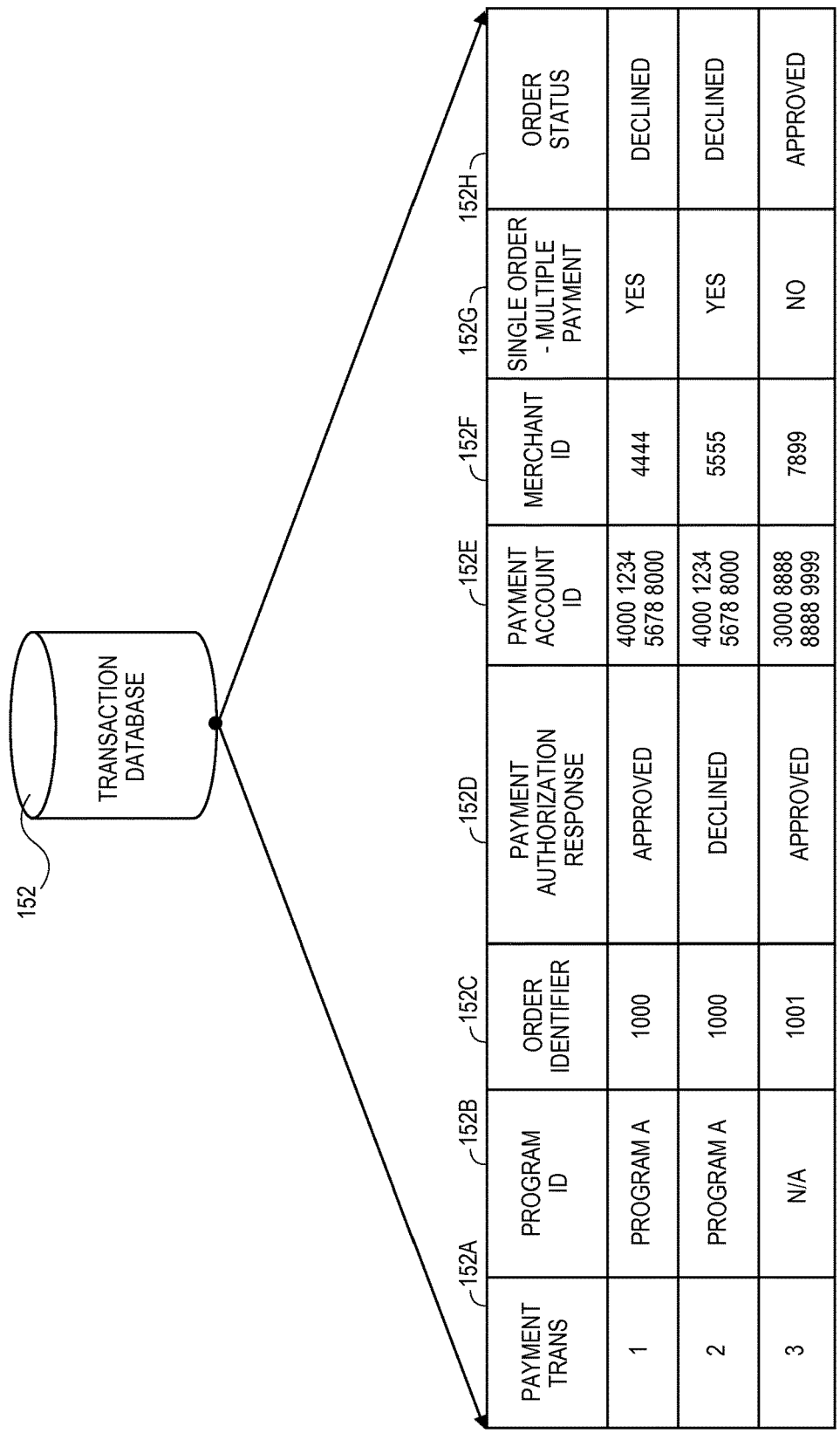
FIG. 3 shows data that may reside in a transaction database.

FIG. 3 shows exemplary data that may reside in a transaction database 152 according to an embodiment of the invention. The transaction database 152 may include a number of columns and rows. Each row may represent a purchase of a set of products, either with other products in a single order with multiple sets of products from different merchants, or a set of products sold without other products from other merchants. The columns of data include columns including payment transaction numbers 152A, program identifiers 152B, order identifiers 152C, authorization responses 152D, payment account identifiers 152E, merchant identifiers 152F, single order—multiple payment order indicators 152G, and order status indicators 152F.

The payment transaction numbers 152A may represent an identifier for each payment transaction. As noted above, there may be multiple payment transactions associated with a single order. There may alternatively be one payment transaction for one order in the transaction database 152.

The program identifier column 152B may store data regarding pre-existing programs between different merchants. For example, a test provider may partner with a test scoring service in a program. The program identifier allows the test provider and/or the test scoring service to search for orders placed under this program. This way, individual merchants such as the test provider and the test scoring service can determine how many products were sold under the program.

The order identifier column 152C may store data relating to an identifier for each order. In this example, the first and second rows represent individual payment transactions for different sets of products from merchants, where the different sets of produce are sold to the consumer in a single order. The same order identifier is therefore present for both rows. The third row represents a transaction that is not part of the same order and has a different order number.

The payment authorization response column 152D provides data regarding the status of each individual payment transaction. Statuses may include "approved," "declined," "reversed," etc.

The payment account ID column 152E may store payment account numbers or other identifiers associated with various funding sources. Examples include credit, debit, and prepaid card account numbers. Other examples include demand account (e.g., checking account) numbers. Corresponding payment account number tokens could also be stored in this column or in another column of data.

The merchant ID column 152F may store identifiers for the merchants that are offering products for sale and that are being paid for those products. The merchant identifiers may be in any suitable form and may include any suitable combination of letters, numbers, and/or symbols. Merchant IDs may be included in authorization request messages to identify the merchants that are to be paid.

The single order multiple payment column 152G may store information regarding whether a particular payment transaction is part of an order that involves multiple merchants.

The order status column 152H may include data indicating the status of the order. As indicated for payment transaction number 1, the order status is declined, even though the payment transaction was originally approved.

Figure 4:
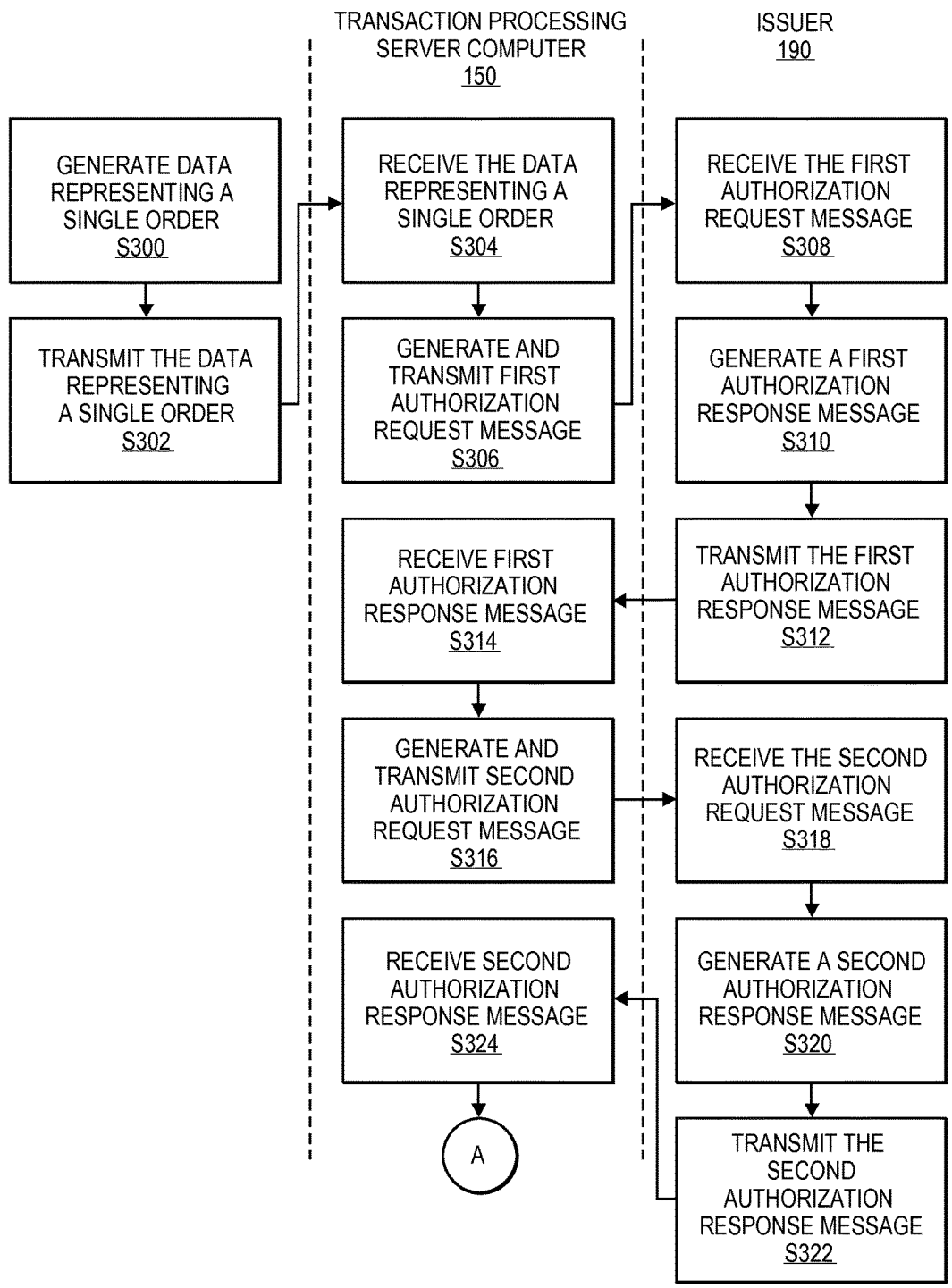
FIGS. 4-5 show a flowchart illustrating embodiments of the invention.
Figure 5:
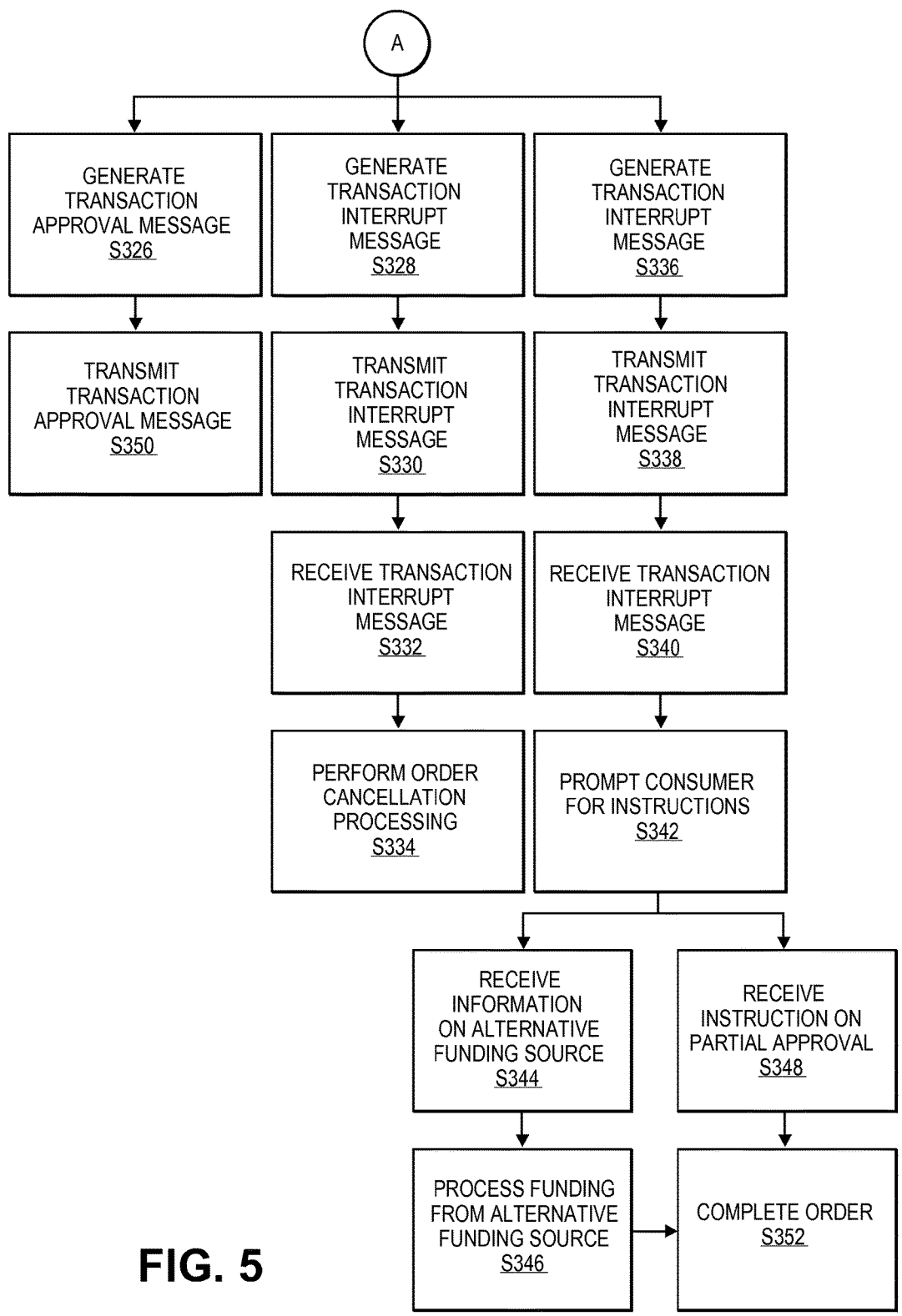

FIGS. 4-5 show flowcharts illustrating methods according to embodiments of the invention. FIGS. 4-5 can be described with reference to FIG. 1 as well as the screenshots shown in FIGS. 6-11. It is understood that embodiments of the invention need not include all of the steps shown in FIGS. 4-5 and some embodiments of the invention may include more steps than are explicitly shown in FIGS. 4-5.

Referring to FIG. 1, a consumer may use a client computer 110 to contact a Web site running on the Web server 124. A Web page such as the one shown in FIG. 6 may be shown to the consumer. The Web page may include data relating to a single order for a first set of products that may be offered by a first merchant and a second set of products offered by a second merchant. In this example, the first merchant (e.g., Acme Corp.) may offer a test for $100 while a second merchant (e.g., Beta Corp.) may offer a hand scoring option for the test for $50. The two products from the first and second merchants are related, since the hand scoring option would not be a product that the consumer would want if the consumer could not purchase the test (and vice-versa). After the consumer 112 has completed all of the desired data input, the consumer 112 may select a payment initiation element such as the "Go to Cart" button in FIG. 6.

Figure 6:
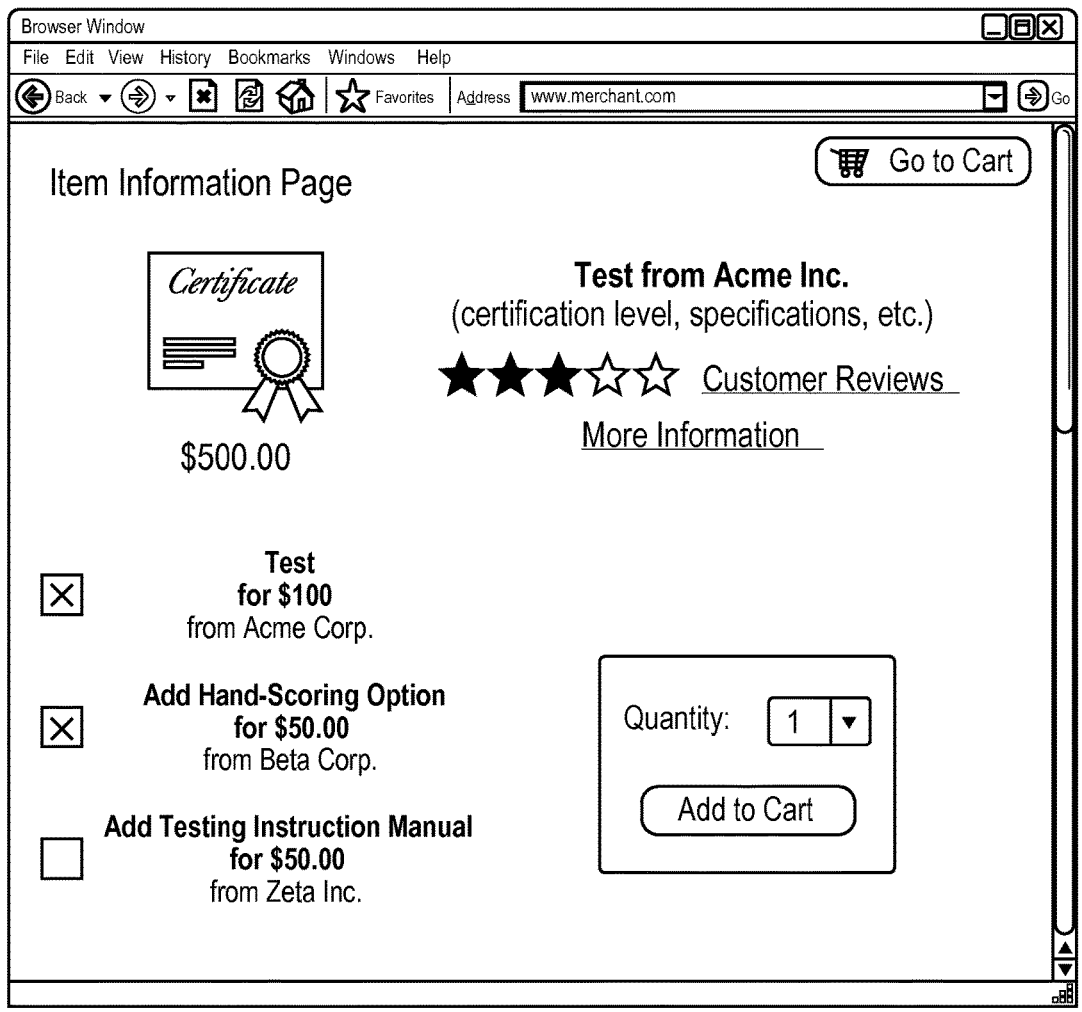

The selection of the payment initiation element such as the "Go to Cart" button in FIG. 6 will cause the client computer 110 to be re-directed to the hosted order page 130.

On the hosted order page 130, the consumer 112 may input payment information including information relating to funding sources (e.g., a credit card number, expiration date, and CW2 value on a credit card) and identification information such as any passcodes, passwords, billing or shipping addresses, etc.

An exemplary hosted order page 130 is shown in FIG. 7. As shown in FIG. 7, the page includes a summary region 425 which summarizes the products ordered in the single order as well as the total price of the single order. It also includes a payment region 435 for entering funding source information and person information region 440 for entering billing information. After all of this information is entered, the "Purchase" button may be selected to start the payment transaction process.

In steps S300 and S302 the client computer 110, Web server 124 or the HOP 130 may then generate data representing a single order for the first set of products and the second set of products, and this data may be transmitted to the transaction processing server computer 150. In the example described with respect to FIG. 7, data relating to the single order may include information including, but not limited to, funding source information, a total purchase price, a first payment transaction amount for a first payment transaction for a first set of products offered by a first merchant, and a second payment transaction amount for a second payment transaction for a second set of products offered by a second merchant.

In step 304, the transaction processing server computer 150 may then receive the data associated with the single order. After the data associated with the single order is received by the transaction server computer 150, a number of authorization request messages may be formatted for the different purchase amounts for the different sets of products offered by the different merchants.

For instance, in step 306, the transaction processing server computer 150 may then generate and transmit a first authorization request message to the issuer 190. The first authorization request message may include a merchant identifier for the first merchant, the amount that the first merchant is to be paid for the first set of products, and the account number (or other identifier) of the payment account that will be used to pay for any products in the single order. The first authorization request message may pass to the issuer 190 via the enterprise platform 190, the communications network 174, the first acquirer 180, and the payment processing network 170. The authorization request message is routed through the first acquirer 180, since the first acquirer 180 is affiliated with the first merchant 120. The first authorization request message may comprise a merchant identifier for the first merchant as well as the transaction amount for the first set of products being purchased.

In step S308, the issuer 190 (or an issuer computer operated by the issuer) receives the first authorization request message. The issuer 190 then analyzes the authorization request message to determine if there are sufficient funds and/or if there is no indication of fraud.

In steps S310 and S312 the issuer 190 then generates and transmits a first authorization response message back to the transaction processing server computer 150 via the payment processing network 170, the first acquirer 180, the communications network 174, and the enterprise platform 160.

In step S314, the transaction processing server computer 150 then receives the first authorization request message. If the first authorization request message indicates that the purchase of the first set of products is approved, then the transaction processing server computer 150 may generate and transmit a second authorization request message for the second set of products offered by the second merchant to the issuer 190 (step S316).

In other embodiments, the second authorization request message may be generated and transmitted without waiting for the first authorization request message to be received at the transaction processing server computer 150. In either case, the second authorization request message may be transmitted from the transaction processor server computer 150 to the issuer 190 via the enterprise platform 190, the communications network 174, the second acquirer 180, and the payment processing network 70. The second authorization request message may comprise a merchant identifier for the second merchant as well as the transaction amount for the second set of products being purchased, and an account number for the funding source used to pay for the single order. The second authorization request message may be routed through the second acquirer 180, since the second acquirer 180 is affiliated with the second merchant 122.

In step S318, the issuer 190 may receive the second authorization request message. After the issuer 190 receives the second authorization request message, in steps S320 and S322, the issuer 190 (or an issuer computer operated by the issuer) may generate and transmit the second authorization response message 322 to the transaction processing server computer 150.

In step S324, the second authorization response message is received by the transaction processing server computer 150. After the first and second authorization response messages are received by the transaction processing server computer 150, the transaction processing server computer can perform a number of additional processing steps according to different situations.

FIG. 5 illustrates different responses that may be provided by the transaction processing server computer 150, after authorization response messages for multiple payment transactions for a single order are received.

Figure 8:
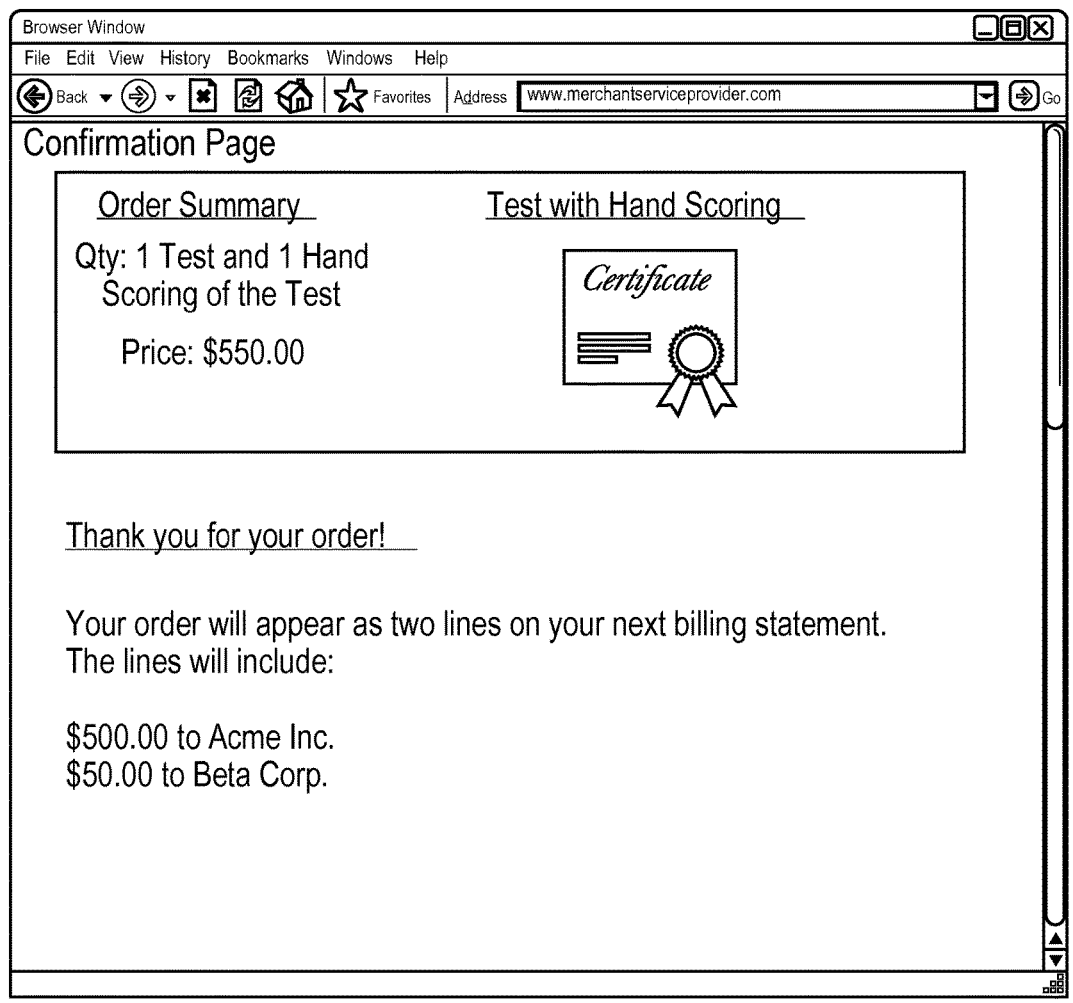
Figure 9:
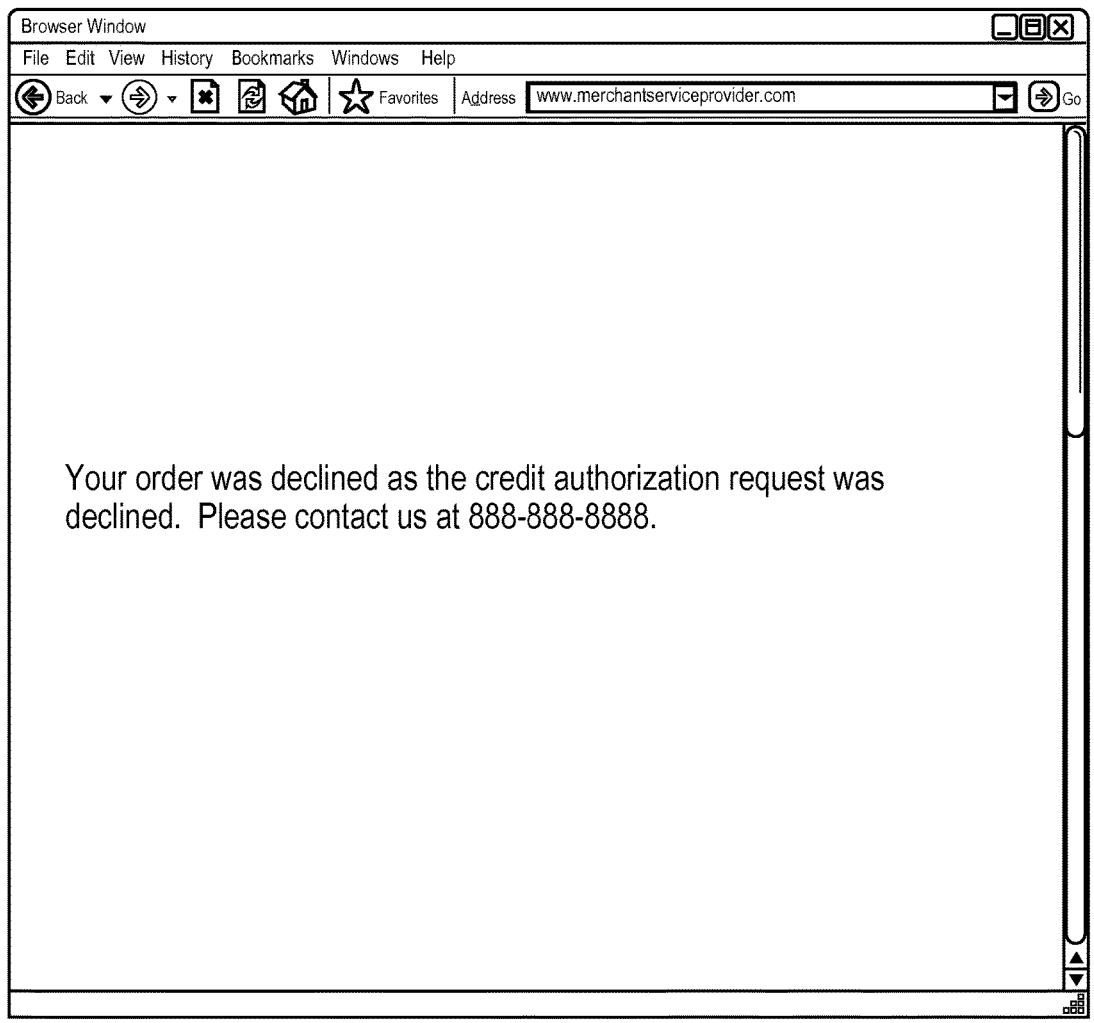

In one embodiment of the invention, both the first and second authorization request messages are approved by the issuer 190. If this occurs, then as shown in steps S326 and S350, a transaction approval message is generated and is then transmitted to the client computer 110 directly, through the HOP 130, or via the Web server 124 to inform the consumer 112 that the transaction is approved. As shown in FIG. 8, the message may be presented on a Web page that provides a summary of the sets of products purchased in the single order. The Web page also has a message that indicates that the charges for the single transaction will come as two entries for two different merchants on the consumer's monthly payment card statement.

At a later point in time, a settlement and clearing process may be performed between the first and second acquirers 180, 182 and the issuer 190 via the payment processing network 170.

In another embodiment of the invention, the first authorization response message received by the transaction processing server computer 150 may indicate that the first authorization request message was approved. However, the second authorization response message received by the transaction processing server computer 150 may indicate that the second authorization request message was declined. If this occurs, then as shown in steps S328 and S330, a transaction interrupt message is generated and is then transmitted to the client computer 10 either directly, through the HOP 130, or via the Web server 124.

In step S332, the transaction interrupt message may be received by the client computer 110. The transaction interrupt message may indicate that the entire transaction has been canceled since all products could not be purchased. An example of this is shown in the Web page in FIG. 9.

In step S334, the transaction processing server computer 150 may then perform order cancellation processing. This can be done by performing chargeback processing. For example, in the illustration described above, a chargeback request message for the amount previously approved for payment to the first merchant may be generated and transmitted by the transaction processing server computer 150 to the issuer 190 via the first acquirer 180. Eventually, a credit may be posted to the consumer's account, offsetting the debit caused by the approval of the first authorization request message.

In another embodiment of the invention, the first authorization request message may have been approved, but the second authorization request message may have been declined. However, instead of cancelling the entire order, the user can either be prompted to provide information on an alternative funding source or be prompted to provide an instruction on whether the consumer wants the products were approved for purchase by the issuer.

As shown in steps S336 and S338, a transaction interrupt message is generated by the transaction processing server computer 150 and is then transmitted to the client computer 110 directly, through the HOP 130, or via the Web server 124.

In step S340, the transaction interrupt message may be received by the client computer 110. The transaction interrupt message may prompt the consumer for instructions (step S342).

Figure 10:

In one embodiment, the transaction interrupt message may prompt the consumer to provide an alternate funding source, and the transaction processing server computer 150 may receive information regarding an alternative funding source from the client computer 110 (step S344). This is shown in FIG. 10, which shows a Web page and a prompt to provide information regarding a different funding source to pay for the remainder of the products in the single order transaction. The Web page may include regions where the consumer 112 may provide an alternate credit, debit, or prepaid account number, demand account number, etc.

The transaction processing server computer 150 may then process funding from the alternative funding source in step S346 and the order may be processed to completion in step S352. For example, if a different credit card number is entered into the Web page shown in FIG. 10, then another authorization request message including a second merchant identifier, the second transaction amount, and other information may be generated and transmitted to the issuer of that credit card. If this additional authorization request message is approved, then the transaction processing server computer 150 may transmit a message to the client computer 110 that the single order has been approved.

Figure 11:
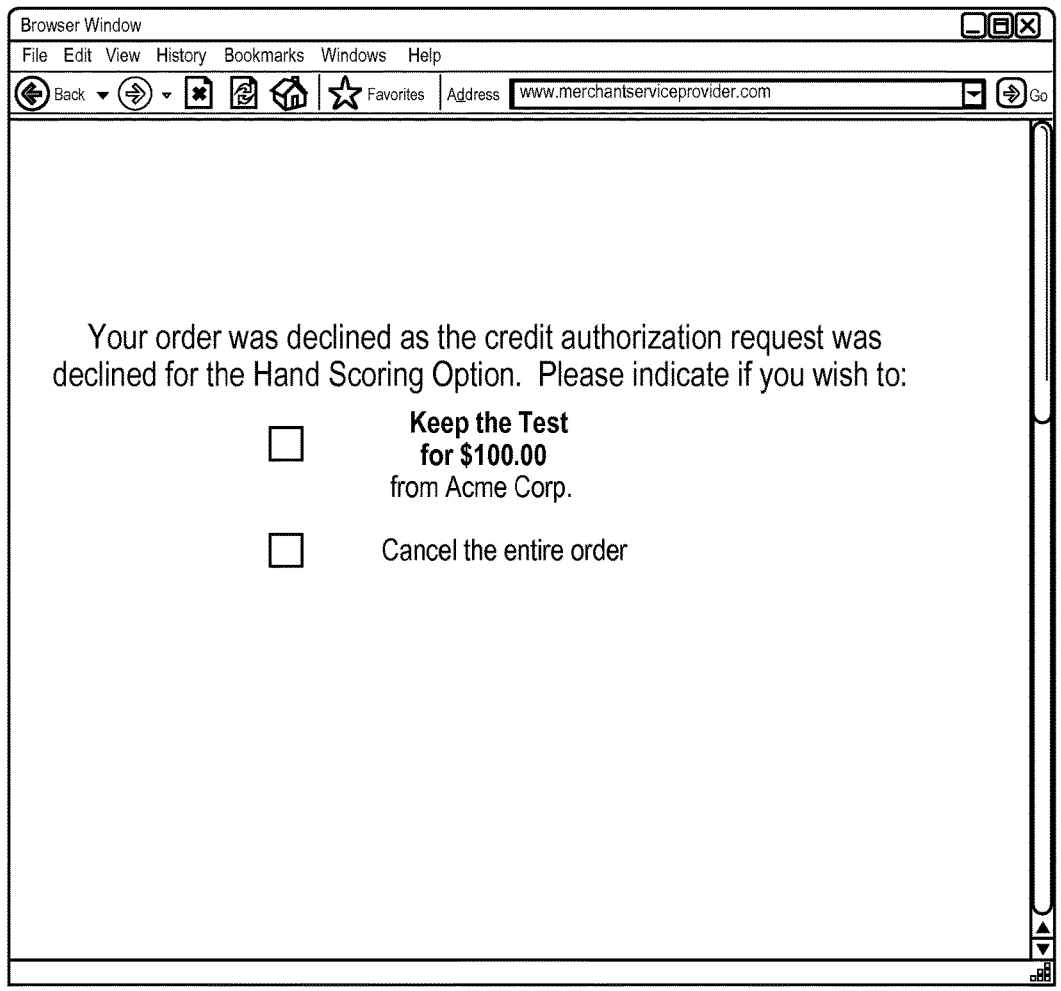

Alternatively, the transaction interrupt message may prompt the consumer to provide an instruction on whether the consumer wants the products were approved for purchase by the issuer. The transaction processing server computer 150 may receive an instruction on partial approval from the client computer 110 (step S348) and the transaction processing server computer 150 may process the order to completion. This is shown in FIG. 11, which shows a Web page providing the consumer 112 with the option to keep what has been approved, or decline the entire single order. If the consumer 112 keeps the approved payment transaction, then a clearing and settlement process may occur with respect to only that payment transaction. If the consumer 112 declines the order, then a chargeback process is initiated for the previously approved payment transaction.

Figure 12:
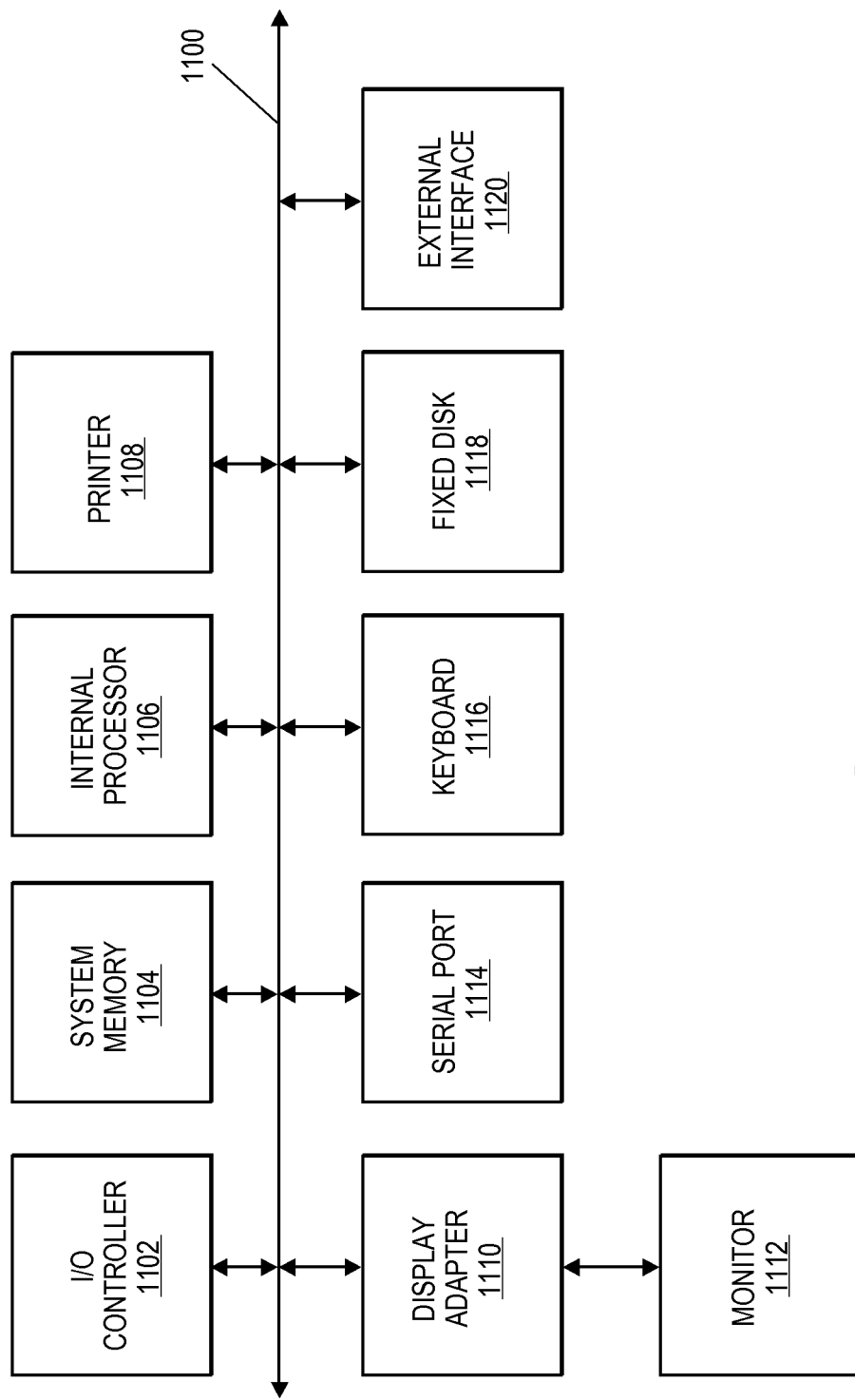
FIG. 12 shows a block diagram of a computer apparatus.

FIG. 12 shows some components in a computer apparatus. The computer apparatus may be used in any of the components illustrated in FIG. 1, and such components may use any suitable combination or number of subsystems shown in FIG. 11. The subsystems shown in FIG. 11 are interconnected via a system bus 1145. Additional subsystems such as a printer 1144, keyboard 1148, fixed disk 1149 (or other memory comprising computer readable media), monitor 1146, which is coupled to display adapter 1182, and others are shown. Peripherals and input/output (I/O) devices, which couple to I/O controller 1141 (which can be a processor or other suitable controller), can be connected to the computer system by any number of means known in the art, such as serial port 1184. For example, serial port 1184 or external interface 1181 can be used to connect the computer apparatus to a wide area network such as the Internet, a mouse input device, or a scanner. The interconnection via system bus allows the central processor 1143 to communicate with each subsystem and to control the execution of instructions from system memory 1142 or the fixed disk 1149, as well as the exchange of information between subsystems. The system memory 1142 and/or the fixed disk 1149 may embody a computer readable medium.

Any of the software components or functions described in this application, may be implemented as machine code executed by a processor. In some embodiments of the invention, the machine code may be generated using source code in any suitable computer language such as, for example, Java, C++ or Perl using, for example, conventional or object-oriented techniques. The machine code may be generated through compilation, interpretation, or any other suitable process. The machine code may be stored as data, a series of instructions, or commands on a computer readable medium, such as a processor cache, a random access memory (RAM), a read only memory (ROM), a magnetic medium such as a hard-drive or a floppy disk, a solid state medium such as a flash drive, or an optical medium such as a CD-ROM. Any such computer readable medium may reside on or within a single computational apparatus, or may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

For example, although many of the examples in this application relate to e-commerce transactions, embodiments can also take place in face-to-face transaction environment as well. For example, an airport service may take the place of the hosted order page that is described above. The customer can open a tab with the airport service by associating a payment card with a temporary account at the airport and purchase multiple goods and services from multiple merchants while they are at the airport on the tab. When the customer has finished shopping, the customer might be presented with a single bill to pay for all their items at one time. In this instance, the airport may not want to be in a position of controlling or centralizing the flow of money for all customers who have opened a tab. The airport may choose to split the payments from the orders and deposit the payments directly to those merchant accounts.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

receiving, at a server computer from a client computer over a network, a single order initiated by a consumer at a single web site detached from payment processing capability, wherein the single order is associated with a first set of products and a second set of products, the first set of products and the second set of products offered by a first merchant associated with a first merchant identifier and a second merchant associated with a second merchant identifier, respectively, wherein the first set of products and the second set of products are offered to the consumer at the single web site;

extracting, by the server computer from the single order, a first payment account identifier for a first funding source associated with the consumer, the first merchant identifier, the second merchant identifier, a first amount for a first payment transaction for the first set of products offered by the first merchant, and a second amount for a second payment transaction for the second set of products offered by the second merchant;

generating, by the server computer, a first authorization request message for the first payment transaction, the first authorization request message comprising the first amount and the first merchant identifier;

transmitting, by the server computer, the first authorization request message to a first issuer computer associated with the first funding source, wherein the first issuer computer is configured to enable payment of the first amount to the first merchant directly from the first funding source associated with the consumer;

receiving, by the server computer, a first authorization response message from the first issuer computer, the first authorization response message indicating whether the first payment transaction is declined by the first issuer computer;

generating, by the server computer, a second authorization request message for the second payment transaction, the second authorization request message comprising the second amount and the second merchant identifier;

transmitting, by the server computer, the second authorization request message to the first issuer computer, wherein the first issuer computer is further configured to enable payment of the second amount to the second merchant directly from the first funding source associated with the consumer;

receiving, by the server computer, a second authorization response message from the first issuer computer, the second authorization response message indicating whether the second payment transaction is declined by the first issuer computer;

determining, by the server computer from the first authorization response message and the second authorization message, that only one of the first payment transaction or the second payment transaction is approved;

upon determining that only one of the first payment transaction or the second payment transaction is approved, generating, by the server computer, an order interrupt message indicating a declined payment transaction based on which of the first payment transaction or the second payment transaction is declined; and transmitting, by the server computer, the order interrupt message to the client computer.

2. The method of claim 1, wherein the first authorization response message approves of the first payment transaction and the second authorization response message declines the second payment transaction, and wherein the method further comprises:

transmitting, to the client computer, the order interrupt message indicating the second payment transaction, for the second set of products offered by the second merchant, is declined.

3. The method of claim 2, wherein the order interruption message comprises options to pay for the second payment transaction using a second funding source different from the first funding source.

4. The method of claim 2, wherein the order interruption message requests instructions from the consumer regarding whether the consumer wants to cancel the single order or proceed with only a purchase of the first set products.

5. The method of claim 2, wherein the order interruption message is an order decline message.

6. The method of claim 1, wherein the first issuer computer is associated with an issuer bank, wherein the issuer bank issues a payment device associated with the first payment account, and wherein the first payment account identifier is associated with the first payment account.

7. The method of claim 1, further comprising:

receiving, by the server computer, a partial approval instruction from the client computer, the partial approval instruction indicating a second payment account identifier for a second funding source associated with the consumer; and generating, by the server computer, a third authorization request message for the declined payment transaction; and transmitting, by the server computer, the third authorization request message to a second issuer computer associated with the second funding source.

8. A server computer comprising:

a processor; and a computer readable medium coupled to the processor, the computer readable medium comprising code, executable by the processor, for implementing a method comprising, receiving, from a client computer over a network, a single order initiated by a consumer at a single web site detached from payment processing capability, wherein the single order is associated with a first set of products and a second set of products, the first set of products and the second set of products offered by a first merchant associated with a first merchant identifier and a second merchant associated with a second merchant identifier, respectively, wherein the first set of products and the second set of products are offered to the consumer at the single web site;

extracting, from the single order, a first payment account identifier for a first funding source associated with the consumer, the first merchant identifier, the second merchant identifier, a first amount for a first payment transaction for the first set of products offered by the first merchant, and a second amount for a second payment transaction for the second set of products offered by the second merchant;

generating a first authorization request message for the first payment transaction, the first authorization request message comprising the first amount and the first merchant identifier;

transmitting the first authorization request message to a first issuer computer associated with the first funding source, wherein the first issuer computer is configured to enable payment of the first amount to the first merchant directly from the first funding source associated with the consumer;

receiving a first authorization response message from the first issuer computer, the first authorization response message indicating whether the first payment transaction is declined by the first issuer computer;

generating a second authorization request message for the second payment transaction, the second authorization request message comprising the second amount and the second merchant identifier;

transmitting the second authorization request message to the first issuer computer, wherein the first issuer computer is further configured to enable payment of the second amount to the second merchant directly from the first funding source associated with the consumer;

receiving a second authorization response message from the first issuer computer, the second authorization response message indicating whether the second payment transaction is declined by the first issuer computer;

determining, by the server computer from the first authorization response message and the second authorization message, that only one of the first payment transaction or the second payment transaction is approved;

upon determining that only one of the first payment transaction or the second payment transaction is approved, generating, by the server computer, an order interrupt message indicating a declined payment transaction based on which of the first payment transaction or the second payment transaction is declined; and transmitting the order interrupt message to the client computer.

9. The server computer of claim 8, wherein the first authorization response message approves of the first payment transaction and the second authorization response message declines the second payment transaction, and wherein the method further comprises:

transmitting, to the client computer, the order interrupt message indicating the second payment transaction, for the second set of products offered by the second merchant, is declined.

10. The server computer of claim 9, wherein the order interruption message is an order decline message.

11. The server computer of claim 9, wherein the order interruption message comprises options to pay for the second payment transaction using a second funding source different from the first funding source.

12. The server computer of claim 9, wherein the order interruption message requests instructions from the consumer regarding whether the consumer wants to cancel the single order or proceed with only a purchase of the first set of products.

13. A system comprising:
the server computer of claim 8; and
the client computer operatively coupled to the server computer, wherein the client computer is configured to transmit the data representing the single order to the server computer, thereby causing the computer to perform the method.

14. The system of claim 13 wherein the client computer is a mobile device.

15. A method comprising:
generating, by a computer, a single order initiated by a consumer at a single web site detached from payment processing capability, wherein the single order is associated with a first set of products and a second set of products, the first set of products and the second set of products offered by a first merchant associated with a first merchant identifier and a second merchant associated with a second merchant identifier, respectively, wherein the first set of products and the second set of products are offered to the consumer at the single web site;

transmitting, the single order associated with the first set of products and the second set of products to a server computer, wherein the server computer is configured to:

extract, from the single order, a first payment account identifier for a first funding source associated with the consumer, the first merchant identifier, the second merchant identifier, a first amount for a first payment transaction for the first set of products offered by the first merchant, and a second amount for a second payment transaction for the second set of products offered by the second merchant;

generate a first authorization request message for the first payment transaction, the first authorization request message comprising the first amount and the first merchant identifier, transmit the first authorization request message to a first issuer computer associated with the first funding source, wherein the first issuer computer is configured to enable payment of the first amount to the first merchant directly from the first funding source associated with the consumer, and receive a first authorization response message from the first issuer computer, the first authorization response message indicating whether the first payment transaction is declined by the first issuer computer, and generate a second authorization request message for the second payment transaction, the second authorization request message comprising the second amount and the second merchant identifier, transmit the second authorization request message to the first issuer computer, wherein the first issuer computer is further configured to enable payment of the second amount to the second merchant directly from the first funding source associated with the consumer, and receive a second authorization response message from the first issuer computer, the second authorization response message indicating whether the second payment transaction is declined by the first issuer computer;

determining, from the first authorization response message and the second authorization message, that only one of the first payment transaction or the second payment transaction is approved;

upon determining that one of the first payment transaction or the second payment transaction is approved, generating an order interrupt message indicating a declined payment transaction based on which of the first payment transaction or the second payment transaction is declined; and transmit the order interrupt message to the computer.

16. The method of claim 15 wherein the first authorization response message approves of the first payment transaction, the second authorization response message declines the second payment transaction, and wherein the server computer is further configured to:

transmit the order interrupt message indicating the second payment transaction, for the second set of products offered by the second merchant, is declined.

17. The method of claim 16 wherein the order interruption message is an order cancellation message.

18. The method of claim 15 wherein the message is an order approval message.

19. The server computer of claim 8, wherein the first issuer computer is associated with an issuer bank, wherein the issuer bank issues a payment device associated with the first payment account, and wherein the first payment account identifier is associated with the first account.

20. The server computer of claim 8, wherein the code, executable by the processor, is further configured for implementing the method comprising:

receiving a partial approval instruction from the client computer, the partial approval instruction indicating a second payment account identifier for a second funding source associated with the consumer; and generating a third authorization request message for the declined payment transaction; and transmitting the third authorization request message to a second issuer computer associated with the second funding source.

\* \* \* \* \*

UNITED STATES PATENT AND TRADEMARK OFFICE
CERTIFICATE OF CORRECTION

PATENT NO. : 10,134,081 B2
APPLICATION NO. : 13/965689
DATED : November 20, 2018
INVENTOR(S) : Lance Weber Page 1 of 1

It is certified that error appears in the above-identified patent and that said Letters Patent is hereby corrected as shown below:

In the Claims

In Column 19, Claim 19, Line 17, please remove "the first account" and insert -- the first payment account --

Signed and Sealed this
Fifteenth Day of January, 2019

Andrei Iancu
*Director of the United States Patent and Trademark Office*